US012755760B1

(12) United States Patent
Wu et al.

(10) Patent No.: US 12,755,760 B1
(45) Date of Patent: Oct. 6, 2026

(54) PREAMPLIFIER FOR A WRITER OF A HARD DISK DRIVE WITH FAST RISE TIME

(71) Applicant: Marvell Asia Pte Ltd, Singapore (SG)

(72) Inventors: Kai Wu, Singapore (SG); Kok Hin Teng, Singapore (SG); Simon Sheung Yan Ng, Singapore (SG); Akash Salow Thomas, Singapore (SG); Aravind Suresh, Singapore (SG); Ziyu Yang, Singapore (SG)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 19/222,362

(22) Filed: May 29, 2025

Related U.S. Application Data

(60) Provisional application No. 63/662,340, filed on Jun. 20, 2024.

(51) Int. Cl.

| | |
|---|---|
| ***G11B 20/10*** | (2006.01) |
| ***G11B 5/012*** | (2006.01) |
| ***G11B 5/02*** | (2006.01) |

(52) U.S. Cl.
CPC ........ *G11B 20/10222* (2013.01); *G11B 5/012* (2013.01); *G11B 5/022* (2013.01); *G11B 2020/10685* (2013.01)

(58) Field of Classification Search
None
See application file for complete search history.

(56) References Cited

U.S. PATENT DOCUMENTS

| | | | | | |
|---|---|---|---|---|---|
| 6,496,317 | B2 * | 12/2002 | Lacombe | G11B 5/022 | 360/68 |
| 6,512,645 | B1 * | 1/2003 | Patti | G11B 5/02 | 360/68 |
| 6,549,353 | B1 * | 4/2003 | Teterud | G11B 19/04 | 360/68 |
| 6,683,487 | B2 * | 1/2004 | Takeuchi | H03K 17/6872 | 327/423 |
| 6,917,484 | B2 * | 7/2005 | Ranmuthu | G11B 5/022 | 360/68 |
| 6,970,316 | B2 * | 11/2005 | Venca | G11B 5/022 | 360/61 |
| 7,068,454 | B2 * | 6/2006 | Kuehlwein | G11B 5/012 | |
| 7,206,155 | B2 * | 4/2007 | Kuehlwein | G11B 5/39 | |
| 7,372,649 | B2 * | 5/2008 | VanEaton | G11B 5/02 | 360/68 |
| 7,382,560 | B2 * | 6/2008 | Barnett | G11B 5/022 | 360/48 |

(Continued)

*Primary Examiner* — Fred Tzeng
(74) *Attorney, Agent, or Firm* — Akona IP PC

(57) ABSTRACT

High density storage solutions demand a preamplifier for a writer with a fast rise time. The quality and speed of the writer depend on the rise time of a write current waveform. To improve the rise time, an improved base driver is implemented at the base terminal of an output transistor of an H-bridge amplifier circuit. The improved base driver has a push-pull driver, a current mirror circuit, and an alternating current coupled signal path. The improved base driver can create a dip in the voltage at the base terminal during a transition edge of a data signal and increase the base to emitter voltage of the output transistor when the output transistor is turning on. The result is a boost in the output current that is driving the writer, which reduces the rise time significantly.

20 Claims, 11 Drawing Sheets

(56) References Cited

U.S. PATENT DOCUMENTS

| | | | | |
|---|---|---|---|---|
| 7,408,313 | B1 * | 8/2008 | Kong | G11B 5/022 318/560 |
| 8,421,510 | B2 * | 4/2013 | Ghosh | H03K 5/01 327/172 |
| 8,829,945 | B2 * | 9/2014 | Santos | H03F 3/217 327/263 |
| 2004/0120065 | A1 * | 6/2004 | Takeuchi | H03K 17/662 360/68 |
| 2004/0196582 | A1 * | 10/2004 | VanEaton | G11B 20/10009 360/68 |
| 2005/0207228 | A1 * | 9/2005 | Yamashita | B82Y 10/00 |
| 2008/0204914 | A1 * | 8/2008 | Hashizume | G11B 5/022 360/68 |
| 2023/0197108 | A1 * | 6/2023 | Poss | G11B 5/027 360/68 |

* cited by examiner

PREAMPLIFIER FOR A WRITER OF A HARD DISK DRIVE WITH FAST RISE TIME

PRIORITY APPLICATION

This patent application claims priority to and/or receives benefit from U.S. Provisional Application No. 63/662,340, titled, "Method to Realize Fast Rise time for Preamplifier Writer for Silicon Germanium (SiGe) Process", filed on Jun. 20, 2024. The U.S. Provisional Application is hereby incorporated by reference in its entirety.

BACKGROUND

Hard disk drives (HDDs) are a type of non-volatile storage device used in computers and other electronic devices to store and retrieve digital data. HDDs have been used computing systems for decades, providing reliable and high-capacity storage solutions. The performance of an HDD is influenced by several factors, including revolutions per minute, data density, and cache size. HDDs are available in various capacities, ranging from a few hundred gigabytes (GB) to several terabytes (TB), making them suitable for a wide range of applications, from personal computing to enterprise storage solutions.

SUMMARY

High density storage solutions demand a preamplifier for a writer with a fast rise time. The quality and speed of the writer depend on the rise time of a write current waveform. To improve the rise time, an improved base driver is implemented at the base terminal of an output transistor of an H-bridge amplifier circuit. The improved base driver has a push-pull driver, a current mirror circuit, and an alternating current coupled signal path. The improved base driver can create a dip in the voltage at the base terminal during a transition edge of a data signal and increase the base to emitter voltage of the output transistor when the output transistor is turning on. The result is a boost in the output current that is driving the writer, which reduces the rise time significantly.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Overview

Figure 1:
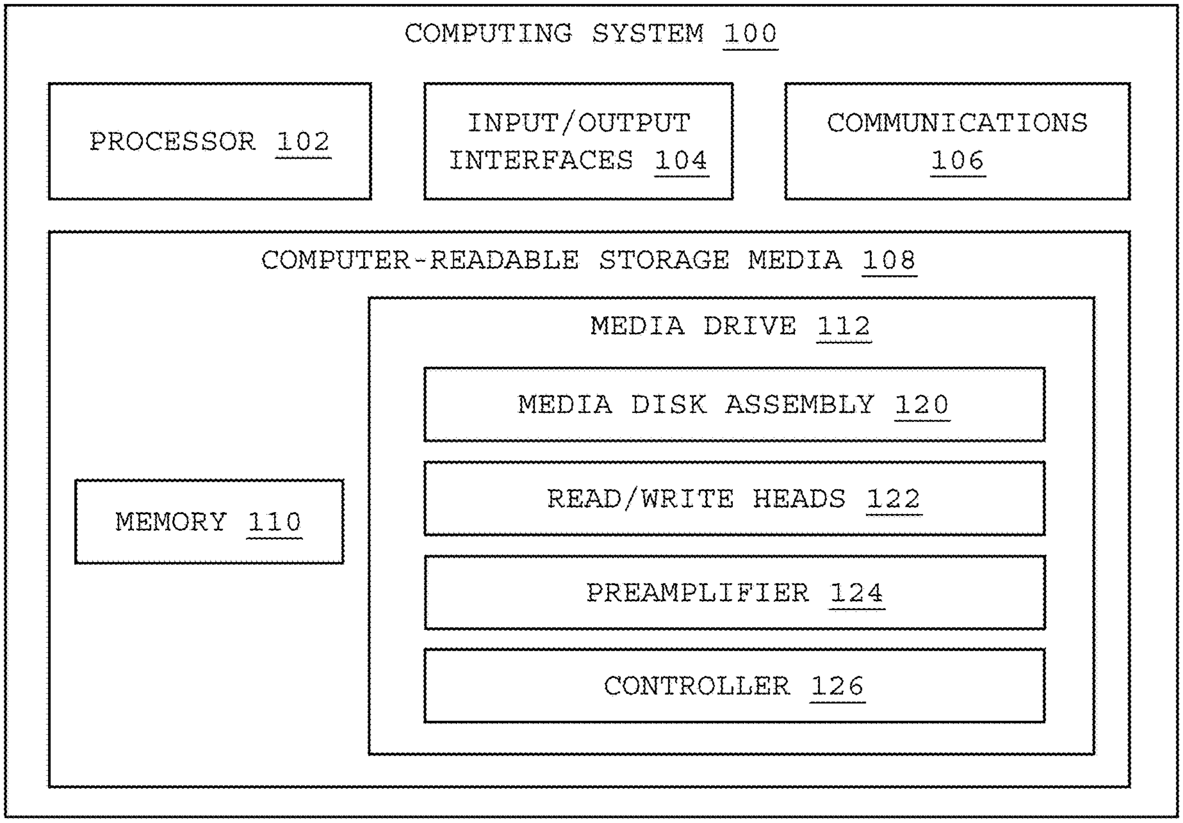
FIG. 1 illustrates an exemplary computing system, according to some embodiments of the disclosure.

High density storage solutions involve super dense HDDs with extremely high data rates. These solutions can offer massive storage capacities and fast data transfer speeds, making them ideal for demanding applications like data centers, cloud storage, and high-performance computing. A modern HDD system demands a preamplifier for a writer with a fast rise time. The writer is one of the building blocks of the HDD system, and the preamplifier for the writer converts and amplifies data signal patterns into large differential currents to drive the writer, which then writes the data on the disk. The quality and speed of the writer depend on the rise time of a write current waveform. The preamplifier for the writer can maintain signal and data integrity by minimizing distortion, so that the writer can accurately and reliably write data at high speeds. Moreover, producing a current waveform with a fast rise time can help transit the bit to be written on the disk much faster. In addition, faster rise times can improve timing resolution, beneficial for synchronizing data transfer at high data rates and for precise writing operations. A high-quality preamplifier is increasingly more important for higher density HDDs with smaller bit cells. For example, advanced recording technologies like Heat-Assisted Magnetic Recording (HAMR) and Microwave-Assisted Magnetic Recording (MAMR) greatly benefit from fast rise time preamplifiers to achieve higher storage densities and faster data rates.

In some implementations, the preamplifier for the writer includes an H-bridge amplifier circuit. To achieve a fast rise time, bipolar junction transistors (BJTs), e.g., implemented using silicon-germanium (SiGe) process, can be used in the H-bridge amplifier circuit to take advantage of the high transition frequency of BJTs. Switching signals or pulses can be applied to the H-bridge amplifier circuit to switch the BJTs on and off to produce a differential current to drive the writer. A high-power push-pull base driver can also be used to generate a buffered base voltage for the output transistors of the H-bridge amplifier. While the transition frequency of BJTs is high, the transition frequency for PNPs in a complementary SiGe process can be limited, which impedes achieving a fast rise time.

A well-regulated base voltage driving the output transistor being switched on and off can assist with faster rise times and good eye diagrams of the output transistor. During switching (e.g., turning on) of a PNP output transistor, the voltage at the base terminal of the output transistor, which may be generated by a voltage buffer in the base driver, can see a transient hump. The transient hump is caused by an intrinsic capacitor that is coupling the emitter terminal to the base terminal of the output transistor and a base current being injected into the low-impedance voltage buffer when the output transistor is being turned on. This hump compresses the base to emitter voltage of the output transistor and dramatically slows down the rise time of the output current waveform.

During switching of an NPN output transistor, the voltage at the base terminal can see a transient dip. The transient dip is caused by an intrinsic capacitor that is coupling the emitter terminal to the base terminal of the output transistor and a base current being pulled from the low-impedance voltage buffer when the output transistor is being turned on. This dip compresses the base to emitter voltage of the output transistor and dramatically slows down the rise time of the output current waveform.

In some solutions, a push-pull driver and an AC coupled path directly at the base terminal of the output transistor is implemented to mitigate the transient hump (or transient dip). However, the effect of the AC coupled path directly at the base terminal of the output transistor is limited by a low output impedance of the push-pull driver.

To improve the rise time, an improved base driver is implemented at the base terminal of an output transistor of an H-bridge amplifier circuit. The improved base driver can better regulate the voltage at the base terminal of the output transistor. In some implementations, the improved base driver has a push-pull driver as a voltage buffer circuit, a current mirror circuit, and an AC coupled signal path.

The push-pull driver as the voltage buffer circuit can output a base voltage to the base terminal of the output transistor. The AC coupled signal path is driven by a short pulse that is generated based on and aligned temporally with a transition edge (e.g., a falling edge or a rising edge) of a data signal or a switching signal being used in the H-bridge amplifier circuit to turn on the output transistor. The short pulse can have pulse width on the order of 100-300 picoseconds (ps). The AC coupled signal path can output a signal based on the short pulse. The current mirror circuit can be coupled to the voltage buffer circuit and the base terminal of the output transistor. The AC coupled signal path can be coupled to the voltage buffer and the current mirror circuit.

The current mirror circuit can conduct the signal generated by the AC coupled signal path based on the short pulse to the base terminal of the output transistor to counter the hump (or dip). When the output transistor is switching on, the short pulse can trigger the current mirror circuit to sink (or push) a large, controlled current from the push-pull driver of the voltage buffer to turn the transient hump into a small dip (or turn the transient dip into a small hump). Accordingly, the improved base driver can create a dip (or a hump) in the base voltage at the base terminal of the output transistor during a transition edge of a data signal or a switching signal. The improved base driver's effect on the base voltage is in the opposite direction of the hump (or dip) that compresses the base to emitter voltage, meaning the improved base driver makes the base to emitter voltage larger for a brief time during switching of the output transistor. Having a larger base to emitter voltage during switching on of the output transistor can cause the output transistor to turn on more quickly to produce an output current with a faster rise time.

The improved base driver can sink (or push) the current that is being injected (or pulled) via the intrinsic capacitor coupling the emitter terminal to the base terminal of the output transistor to counter the hump (or dip) during the transition edge and further create a dip (or hump) in the opposite direction. The dip (or hump) can increase the base to emitter voltage of the output transistor when the output transistor is turning on. The resulting effect is a strong boost in the output current that is driving the writer, which reduces the rise time significantly and overcomes the transition frequency limitation of SiGe BJTs. The boost effect can be tuned by adjusting a current gain ratio in the current mirror circuit. Advantageously, the preamplifier can use less power and can provide controlled current peaking to counter transmission line bandwidth limitations.

Exemplary Computing System

FIG. 1 illustrates computing system 100, according to some embodiments of the disclosure. Examples of computing system 100 can include: laptop computers, desktop computers, mobile computing devices, data servers.

Computing system 100 may include processor 102. Processor 102 may manage data processing tasks. Processor 102 can include one or more suitable types of processors, and one or more suitable number of processors. Processor 102 may be a single-core processor, or a multi-core (e.g., ARM or x86 processor cores). Examples of processor 102 may include a central processing unit (CPU), a graphics processing unit (GPU), a field-programmable gate array (FPGA), a tensor processing unit (TPU), a data processing unit (DPU), a digital signal processor (DSP), an application specific integrated circuit (ASIC), etc. Processor 102 can execute instructions or commands of an operating system. Processor 102 can perform operations and/or computations for an application of computing system 100.

Computing system 100 may include input/output interfaces 104. Input/output interfaces 104 may include one or more interfaces to facilitate communication between processor 102 and one or more external devices. Input/output interfaces 104 can include ports for connecting peripherals, such as Universal Serial Bus (USB), audio inputs/outputs, displays, and human interface devices.

Computing system 100 may include communications 106. Communications 106 may handle data network connectivity, including wired interfaces like Ethernet or fiber optic interfaces, and wireless interfaces for communication over wireless networks such as Wireless Local Area Networks (WLANs), cellular networks, and Wireless Personal Area Networks (WPANs). Examples of communications 106 include a Gigabit Ethernet port for fast wired network connections and a Wi-Fi module supporting 802.11ac for high-speed wireless internet access.

Computing system 100 may include computer-readable storage media 108. Computer-readable storage media 108 may include memory 110. Computer-readable storage media 108 may include media drive 112. Computer-readable storage media 108 may store instructions, when executed by processor 102, that cause processor 102 to perform one or more operations.

Memory 110 can include volatile memory. Memory 110 can include non-volatile memory. Volatile memory may include various types of random-access memory (RAM), e.g., Dynamic Random-Access Memory (DRAM) and Static Random-Access Memory (SRAM). Non-volatile memory may include Read-Only Memory (ROM), Electrically Erasable Programmable Read-Only Memory (EEPROM), and Flash memory. These memories can data associated with the application and/or the operating system executing on processor 102.

An example of media drive 112 is an HDD, which is a type of non-volatile storage device used in computing system 100 to physically store and retrieve data. Media drive 112 may include media disk assembly 120. Media disk assembly 120 may include the physical disks or platters where data is stored magnetically. Platters are circular disks coated with magnetic material where data is stored. Platters can be made of aluminum or glass and are coated with a thin layer of magnetic material. The platters are mounted on a spindle, which is rotated by a motor. The platters can be mounted on an integrated spindle and motor assembly, which rotates the disks under read/write heads 122. Media disk assembly 120 can include multiple platters, each storing data on both sides. The speed at which the platters spin is measured in revolutions per minute (RPM), with common speeds being 5400 RPM, 7200 RPM, and higher for performance drives.

Media drive 112 may include read/write heads 122. Read/write heads 122 read data from and write data to the disks. Read/write heads 122 are positioned by an actuator, floating just above the surface of the platters, to access different areas of the disk surface. The actuator may have an arm that moves the read/write heads across the platters to access different tracks and sectors. The movement is controlled by a voice coil motor, which allows precise positioning. Read/write heads 122 may include dedicated read and write elements (e.g., referred to herein as readers or writers). For instance, read/write heads 122 may include a Giant Magnetoresistive (GMR) read head that detects magnetic changes on the disk surface with high sensitivity. Read/write heads 122 may include a write head that generates magnetic fields and alters the magnetic fields on the disk surface to write data.

Media drive 112 may include preamplifier 124. Preamplifier 124 may include a preamplifier for a writer to amplify the signals to the write heads before they are used by the write heads. The preamplifier for the writer ensures that the signals are strong enough for accurate data writes. Preamplifier 124 may include a preamplifier for a reader to amplify the signals acquired by the read heads before they are processed. The preamplifier for the reader ensures that the signals are strong enough for accurate data reads/interpretation. The preamplifier for the reader can boost weak signals from the read head to a level suitable for digital processing, ensuring reliable data readback.

Media drive 112 may include controller 126. Controller 126 can manage the overall operation of media drive 112, including the movement and positioning of read/write heads 122, the processing of data signals, data encoding/decoding, and communication with the computer system. Controller 126 can include a storage media controller, servo control unit, and read/write channel. The storage media controller enables processor 102 to access contents of media disk assembly 120, such as an operating system, applications, or data for applications or other services. The storage media controller can write and read data to and from media disk assembly 120. For example, the storage media controller may manage data caching to improve read/write performance. The servo control unit can ensure precise positioning of read/write heads 122 to access specific data sectors on media disk assembly 120 and manages the encoding and decoding of data signals. The servo control unit controls mechanical operations, such as positioning of read/write heads 122 and rotational speed control through the spindle and motor assembly of media disk assembly 120. For instance, it ensures read/write heads 122 are accurately positioned over the correct track on the disk. The read/write channel includes digital-to-analog and analog-to-digital paths for converting write data to write signals or converting read signals to read data. The read/write channel processes and encodes signals when data is written to media disk assembly 120 and decodes signals when data is read from media disk assembly 120. For example, the read/write channel handles signal conditioning, sampling, equalization, phase adjustment, detection, and error correction to ensure reliable data storage and retrieval.

Understanding BJTs

NPN and PNP are the two main types of BJTs, which are used in electronic circuits for amplification and switching. An NPN transistor has a layer of p-type semiconductor sandwiched between two n-type semiconductors. When a positive voltage is applied to the base relative to the emitter (e.g., the base to emitter voltage is positive), it allows current to flow from the emitter to the collector, controlled by the base current. Electrons are the majority charge carriers in NPN transistors, making them efficient for many applications. On the other hand, a PNP transistor has a layer of n-type semiconductor sandwiched between two p-type semiconductors. When a negative voltage is applied to the base relative to the emitter (e.g., the base to emitter voltage is positive), it allows current to flow from the emitter to the collector, also controlled by the base current. In PNP transistors, holes are the majority charge carriers. This difference in charge carriers and voltage polarity makes PNP transistors suitable for specific applications where negative voltage supplies are used. The differences between NPN and PNP transistors lie in their polarity and charge carriers. NPN transistors uses a positive voltage at the base and use electrons as the majority carriers, while PNP transistors uses a negative voltage and use holes. Due to their faster switching speeds and easier integration with positive voltage supplies, NPN transistors can be more commonly used in various electronic applications than PNPs.

Understanding Metal-Oxide-Semiconductor Field-Effect Transistors (MOSFETs)

N-type MOSFETs (NMOS) and PMOS (p-type metal-oxide-semiconductor) transistors are building blocks for integrated circuits made using complementary metal-oxide-semiconductor (CMOS) technology. NMOS transistors have n-type source and drain regions and a p-type substrate, and they conduct when a positive voltage is applied to the gate, allowing electrons to flow from the source to the drain. Conversely, PMOS transistors have p-type source and drain regions and an n-type substrate, and they conduct when a negative voltage is applied to the gate, allowing holes to flow from the source to the drain. Together, NMOS and PMOS transistors enable efficient switching and amplification functions in various electronic devices.

Issues that Limit Rise Time of Preamplifiers for Writers

A write current waveform for HDD writer coils in the writer heads is a signal that controls how data is magnetically encoded onto the disk. The write current waveform may be characterized by: rapid polarity reversals (transitions between positive and negative current), precise timing to control bit density, current pulses with carefully controlled rise/fall times, and amplitude modulation depending on the specific recording technology. The write current flows through the writer coil (part of the write head), which generates a magnetic field that aligns the magnetic domains on the disk platter surface. When the current direction changes, it flips the magnetic orientation of the domains, encoding binary data. Some HDDs utilizing perpendicular magnetic recording (PMR) or energy-assisted recording technologies may use specialized current waveforms optimized for the physics of these recording methods.

Figure 2:
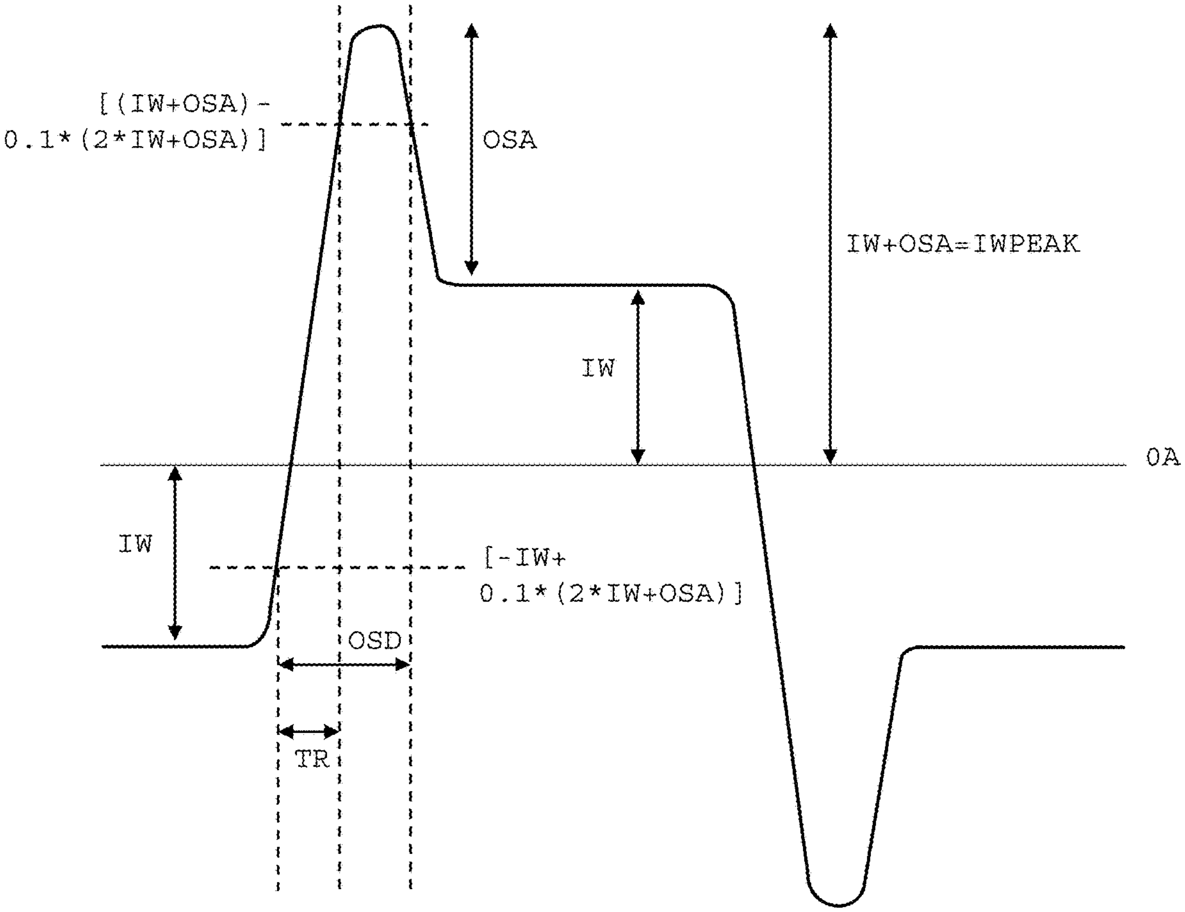
FIG. 2 illustrates a current waveform for a writer, according to some embodiments of the disclosure.

FIG. 2 illustrates a current waveform for a writer or a writer coil, according to some embodiments of the disclosure. The current waveform is characterized by several parameters, such as IW, OSA, TR, and OSD. IW represents a steady state current that follows a data signal or data pattern. OSA represents an overshoot current that is added on top of the steady state current IW to deliver a large current during bit transition (e.g., transitioning from 1 to 0 or transitioning from 0 to 1). IWPEAK=IW+OSA represents a peak current which is a sum of IW and OSA. OSD represents a duration of the OSA pulse. TR represents a rise time metric that measures how fast a current switches from [−IW+0.1*(2*IW+OSA)] to [(IW+OSA)−0.1*(2*IW+OSA)].

One or more preamplifiers can be implemented to produce the current waveform, such as the current waveform seen in FIG. 2. One preamplifier can be implemented to produce the IW current based on the data. Another preamplifier can be implemented to produce the OSA overshoot current based on the data. The latter amplifier can play a role in reducing rise time of the current driving the writer by producing a strong OSA overshoot current with fast rise time. The preamplifier can include a differential H-bridge amplifier design to achieve a fast rise time in SiGe process.

Figure 3:
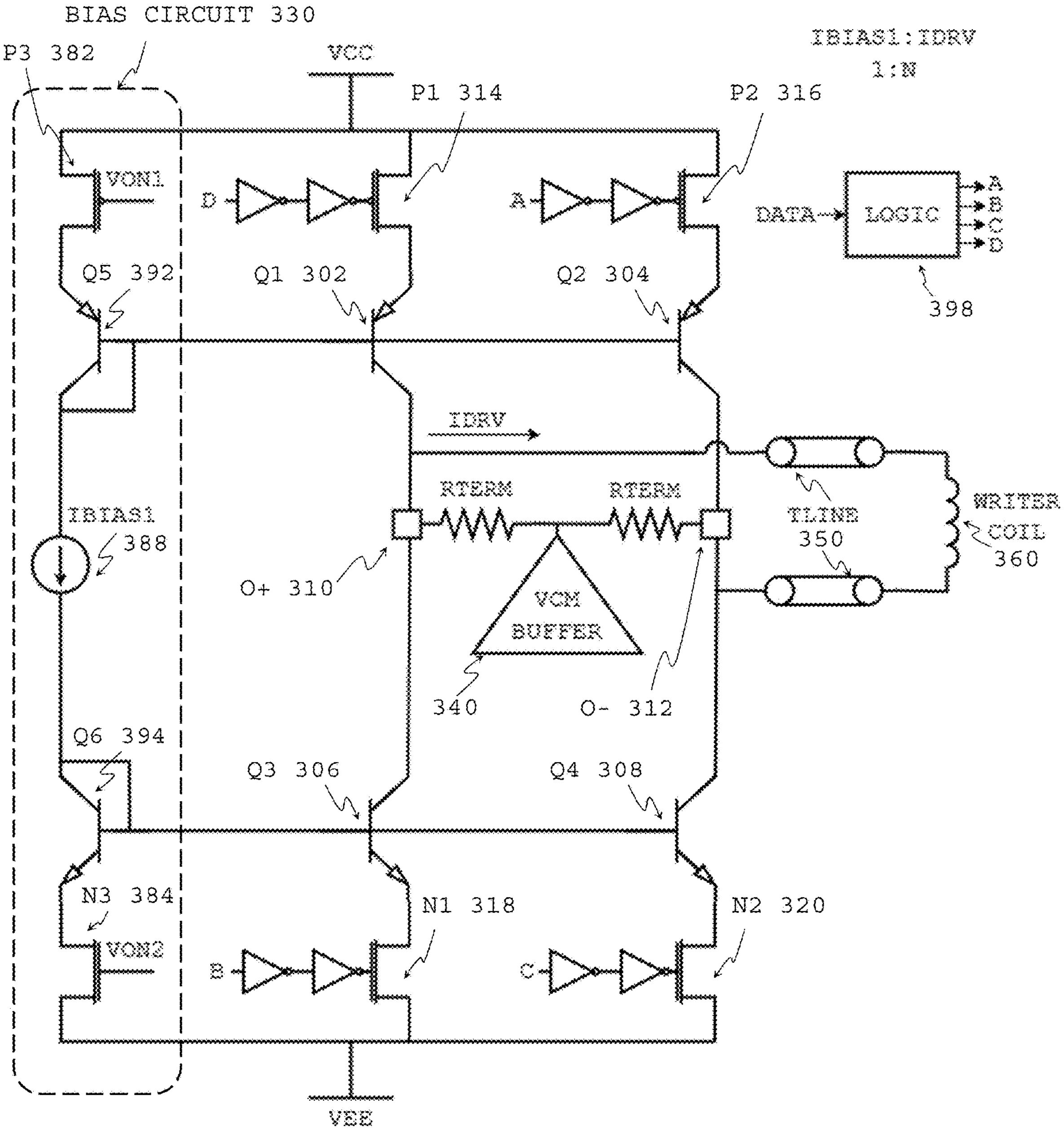
FIG. 3 illustrates a preamplifier for a writer, according to some embodiments of the disclosure.
Figure 4:
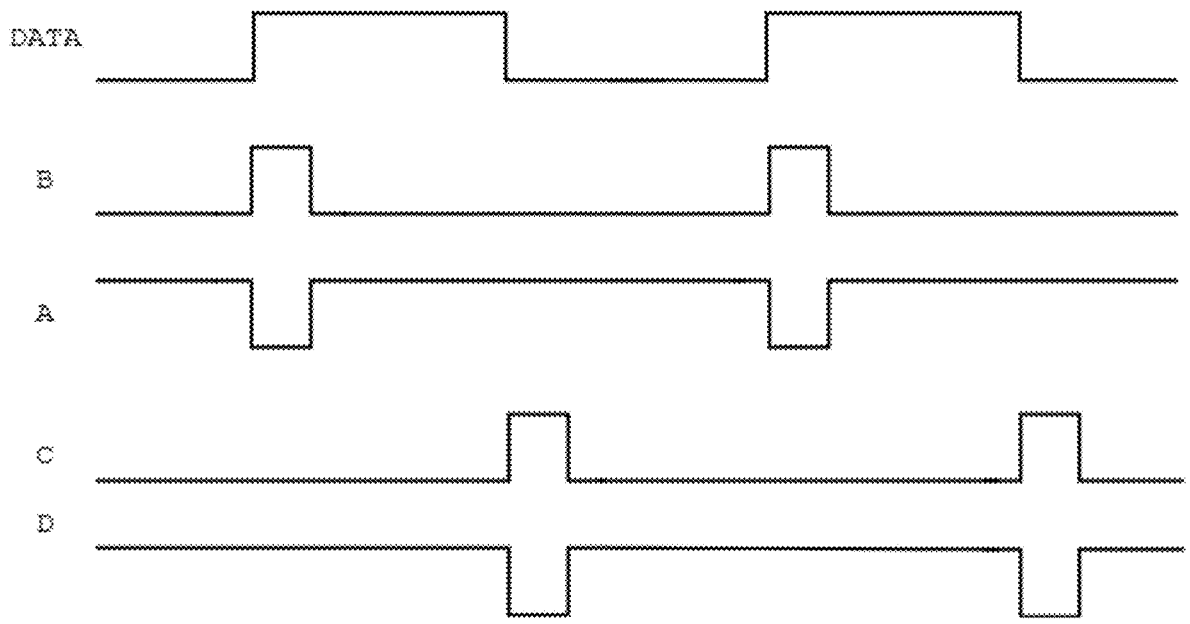
FIG. 4 illustrates voltage waveforms of a data signal and switching signals for the preamplifier, according to some embodiments of the disclosure.

FIG. 3 illustrates a preamplifier for a writer that produces the OSA overshoot current, according to some embodiments of the disclosure. FIG. 4 illustrates voltage waveforms of a data signal DATA and switching signals A, B, C, and D for the preamplifier, according to some embodiments of the disclosure. To produce the OSA overshoot current (which can be added to or combined with the IW current generated by a different preamplifier), switching signals A, B, C, and D are used to switch the transistors in the preamplifier. Switching signals A, B, C, and D have short pulses that are generated based on the transition edges (e.g., A and B at rising edges of the data signal DATA; C and D at the falling edges of the data signal DATA) in the data signal DATA. The short pulses are relatively short when compared to the duration of a data bit in data signal DATA to produce OSA overshoot current with fast rise time during bit transitions. The preamplifier may include logic 398 to generate switching signals A, B, C, and D based on data signal DATA.

The preamplifier includes a differential H-bridge amplifier circuit, which includes BJT transistors including: PNP Q1 302, PNP Q2 304, NPN Q3 306, and NPN Q4 308. The transistors of differential H-bridge amplifier circuit are arranged in a symmetrical arrangement in an H-shaped configuration to allow the H-bridge amplifier circuit to operate with complementary push-pull action. The BJTs are referred herein as output transistors, since their collector terminals produce the current output to drive the writer. The collector terminals of PNP Q1 302 and NPN Q3 306 are coupled together at output node O+ 310. The collector terminals of PNP Q2 304 and NPN Q4 308 are coupled together at output node O− 312. The H-bridge arrangement can create a balanced differential output with improved common-mode rejection and extended linear output voltage swing.

The output nodes O+ 310 and O− 312 supply current to writer coil 360. O+ 310 is connected to one end of writer coil 360 via a transmission line. O− 312 is connected to the other end of writer coil 360 via a transmission line.

The differential H-bridge amplifier circuit can be a hybrid H-bridge amplifier that uses BJTs as output transistors and MOSFETs to perform emitter switching. The fast switching rise time of the BJTs can be realized by switching the emitter terminals of the PNPs and NPNs efficiently using MOSFETs, making use of the high transition frequency advantages of BJT devices.

The emitter terminal of the PNP Q1 302 is switched by PMOS P1 314. The drain terminal of PMOS P1 314 is coupled to the emitter terminal of PNP Q1 302. The gate terminal of PMOS P1 314 may be controlled by signal D, which may be passed to the gate terminal through a buffer or a delay path having two inverters. When the signal D is low, PMOS P1 314 is turned on, which turns on PNP Q1 302 by coupling the emitter to a voltage supply VCC to create a sufficient base to emitter voltage for PNP Q1 302 to turn on. When the signal D is high, PMOS P1 314 is turned off, which turns off PNP Q1 302.

The emitter terminal of PNP Q2 304 is switched by PMOS P2 316. The drain terminal of PMOS P2 316 is coupled to the emitter terminal of PNP Q2 304. The gate terminal of PMOS P2 316 may be controlled by signal A, which may be passed to the gate terminal through a buffer or a delay path having two inverters. When the signal A is low, PMOS P2 316 is turned on, which turns on PNP Q2 304 by coupling the emitter to a voltage supply VCC to create a sufficient base to emitter voltage for PNP Q2 304 to turn on. When the signal A is high, PMOS P2 316 is turned off, which turns off PNP Q2 304.

The emitter terminal of NPN Q3 306 is switched by NMOS N1 318. The drain terminal of NMOS N1 318 is coupled to the emitter terminal of NPN Q3 306. The gate terminal of NMOS N1 318 may be controlled by signal B, which may be passed to the gate terminal through a buffer or a delay path having two inverters. When the signal B is high, NMOS N1 318 is turned on, which turns on NPN Q3 306 by coupling the emitter to a voltage supply VEE to create a sufficient base to emitter voltage for NPN Q3 306 to turn on. When the signal B is low, NMOS N1 318 is turned off, which turns off NPN Q3 306.

The emitter terminal of NPN Q4 308 is switched by NMOS N2 320. The drain terminal of NMOS N2 320 is coupled to the emitter terminal of NPN Q4 308. The gate terminal of NMOS N2 320 may be controlled by signal C, which may be passed to the gate terminal through a buffer or a delay path having two inverters. When the signal C is high, NMOS N2 320 is turned on, which turns on NPN Q4 308 by coupling the emitter to a voltage supply VEE to create a sufficient base to emitter voltage for NPN Q4 308 to turn on. When the signal Cis low, NPN Q4 308 is turned off, which turns off NPN Q4 308.

The base terminals of the BJTs in the H-bridge amplifier circuit may be biased by bias circuit 330 to operate at a particular base voltage. Bias circuit 330 may include PMOS P3 382, whose gate terminal is driven by VON1, a (low) voltage that causes PMOS P3 382 to be always on. Bias circuit 330 may include NMOS N3 384, whose gate terminal is driven by VON2, a (high) voltage that causes NMOS N3 384 to be always on. Bias circuit 330 may include a current source 388 implementing a bias current (shown as IBIAS1). The bias current flows through diode connected PNP Q5 392 and NPN Q6 394 to produce a stable/regulated base voltage at PNP Q5 392 and a stable/regulated base voltage at NPN Q6 394. The base voltage at PNP Q5 392 is applied to the base terminals of PNP Q1 302 and PNP Q2 304. The base voltage at NPN Q6 396 is applied to the base terminals of NPN Q3 306 and NPN Q4 308.

PNP Q5 392 and PNP Q1 302 in bias circuit 330, and PNP Q1 302 and NPN Q3 306 in an output branch, may be scaled or sized according to a ratio of 1:N, where a multiple of the bias current IBIAS1 may be generated as the output current or driving current IDRV at the output node O+ 310. PNP Q5 392 and PNP Q1 302 in bias circuit 330, and PNP Q2 304 and NPN Q4 308 in a further output branch, may be scaled or sized according to a ratio of 1:N, where a multiple of the bias current IBIAS1 may be generated as the output current or driving current IDRV at the output node O− 312. The differential current IDRV may be used as the OSA overshoot current. Scaling can offer amplification or gain functionality to produce IDRV at a multiple of bias current IBIAS1.

In the hybrid differential H-bridge amplifier circuit, the corresponding MOSFET controls the emitter current path of the corresponding BJT, to switch the corresponding BJT on or off depending on the gate signal driving the corresponding MOSFET. The MOSFETs can function as fast, low-loss switches (e.g., due to the fast switching speeds and low on-resistances of the MOSFETs) that selectively turn the BJTs on or off to direct current flow to the output nodes, O+ 310 and O− 312. In particular, the switching signals A, B, C, and D control the MOSFET gate voltages, determining which emitter paths are active.

As seen in FIG. 4, the switching signals A and B (having a pulse much shorter than the data pulse) turn on PNP Q2 304 and NPN Q3 306 respectively for a duration of time to produce the OSA overshoot current when the data signal has a transition edge going from low to high. The switching signals A and B keep the PNP Q2 304 and NPN Q3 306 off respectively otherwise. The switching signals Cand D (having a pulse much shorter than the data pulse) turn on NPN Q4 308 and PNP Q1 302 respectively for a duration of time to produce the OSA overshoot current when the data signal has a transition edge going from high to low. The switching signals C and D keep the NPN Q4 308 and PNP Q1 302 off respectively otherwise. When a MOSFET is turned on, the MOSFET provides a low-impedance path for the corresponding BJT's emitter current, and the BJTs operate in the linear region when their respective MOSFETs are activated. Diagonal pairs of BJTs and MOSFETs (Q1+P1 with Q4+N2, and Q2+P2 with Q3+N1) are switched in complementary or ping-pong fashion.

Referring back to FIG. 3, between O+ 310 and O− 312 may have termination resistances RTERM to match the impedance of transmission line on suspension (shown as TLINE 350). A common-mode voltage buffer (shown as VCM buffer 340) may be included between the termination resistances RTERM to control or regulate the common-mode or direct current (DC) voltage appearing between O+ 310 and O− 312.

Figure 5:
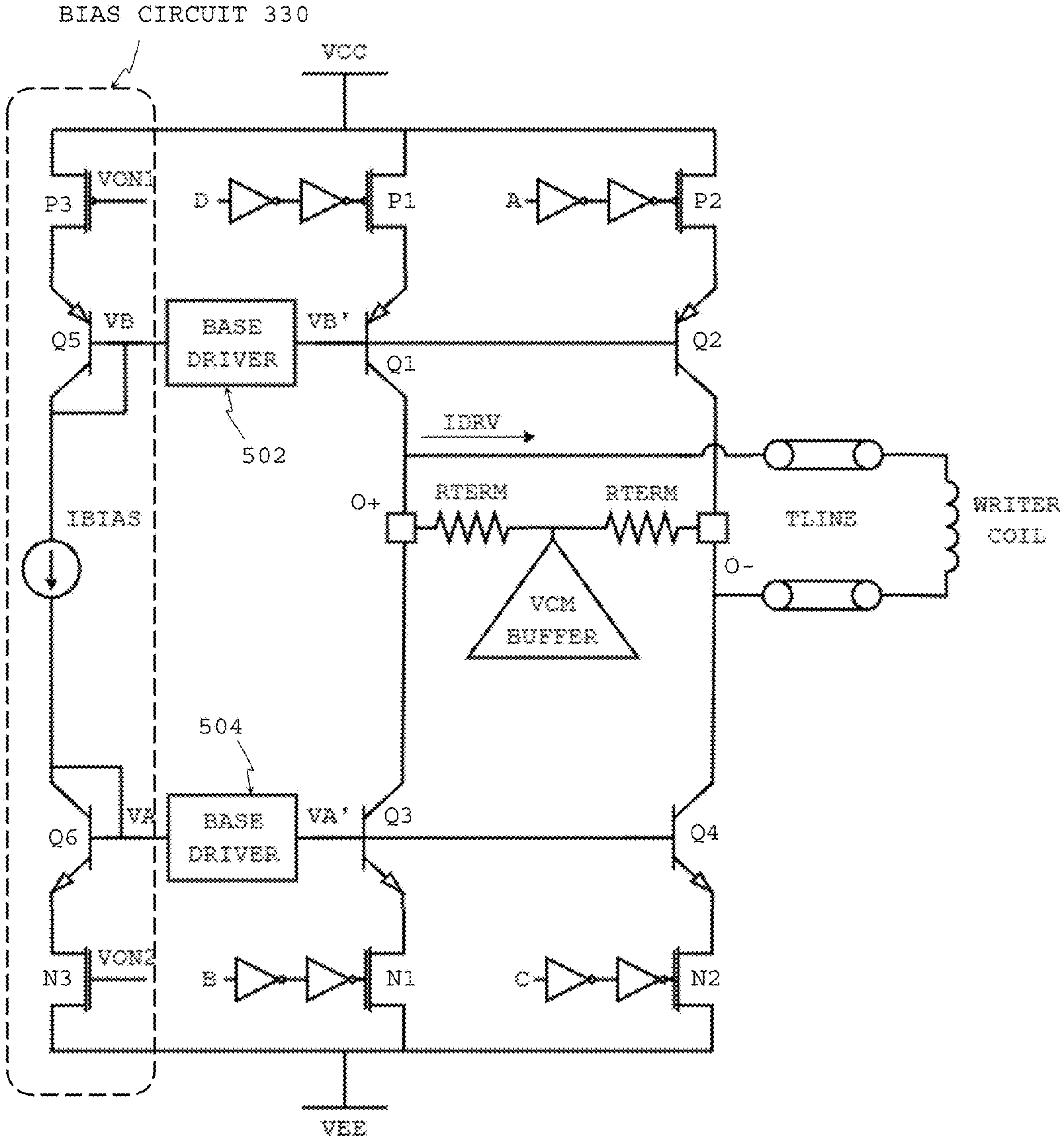
FIG. 5 illustrates a preamplifier having a base driver, according to some embodiments of the disclosure.

For some HDDs, the data signal DATA may be switching up to 5.5 Gigabits per second (Gbps) with a random pattern. A strong base driver, such as a voltage buffer, can be included in the preamplifier to realize fast rise time. A well-regulated base voltage can ensure that the BJTs can be turned on as quickly as possible to realize a fast rise time for the output current. FIG. 5 illustrates a preamplifier having a base driver, according to some embodiments of the disclosure. For simplicity, the transistors are referenced using their unique labels, such as P1, P2, P3, N1, N2, N3, Q1, Q2, Q3, Q4, Q5, and Q6.

The base terminal of Q5 of bias circuit 330 may be biased/held at a base voltage VB. To regulate the base voltage (e.g., to keep the base voltage steady and free from distortions or noise from other circuitry), base driver 502 may be implemented to buffer the base voltage VB and output a buffered base voltage VB'. The buffered base voltage VB' is then used to drive the base terminals of Q1 and Q2. Ideally, VB=VB', Base driver 502 may isolate the buffered base voltage VB' from other circuitry such as bias circuit 330.

The base terminal of Q6 of bias circuit 330 may be biased/held at a base voltage VA. Similarly on the other side of the differential circuit, base driver 504 may be implemented to buffer the base voltage VA and output a buffered base voltage VA'. The buffered base voltage VA' is then used to drive the base terminals of Q3 and Q4. Ideally, VA=VA', Base driver 504 may isolate the buffered base voltage VA' from other circuitry such as bias circuit 330.

Figure 6:
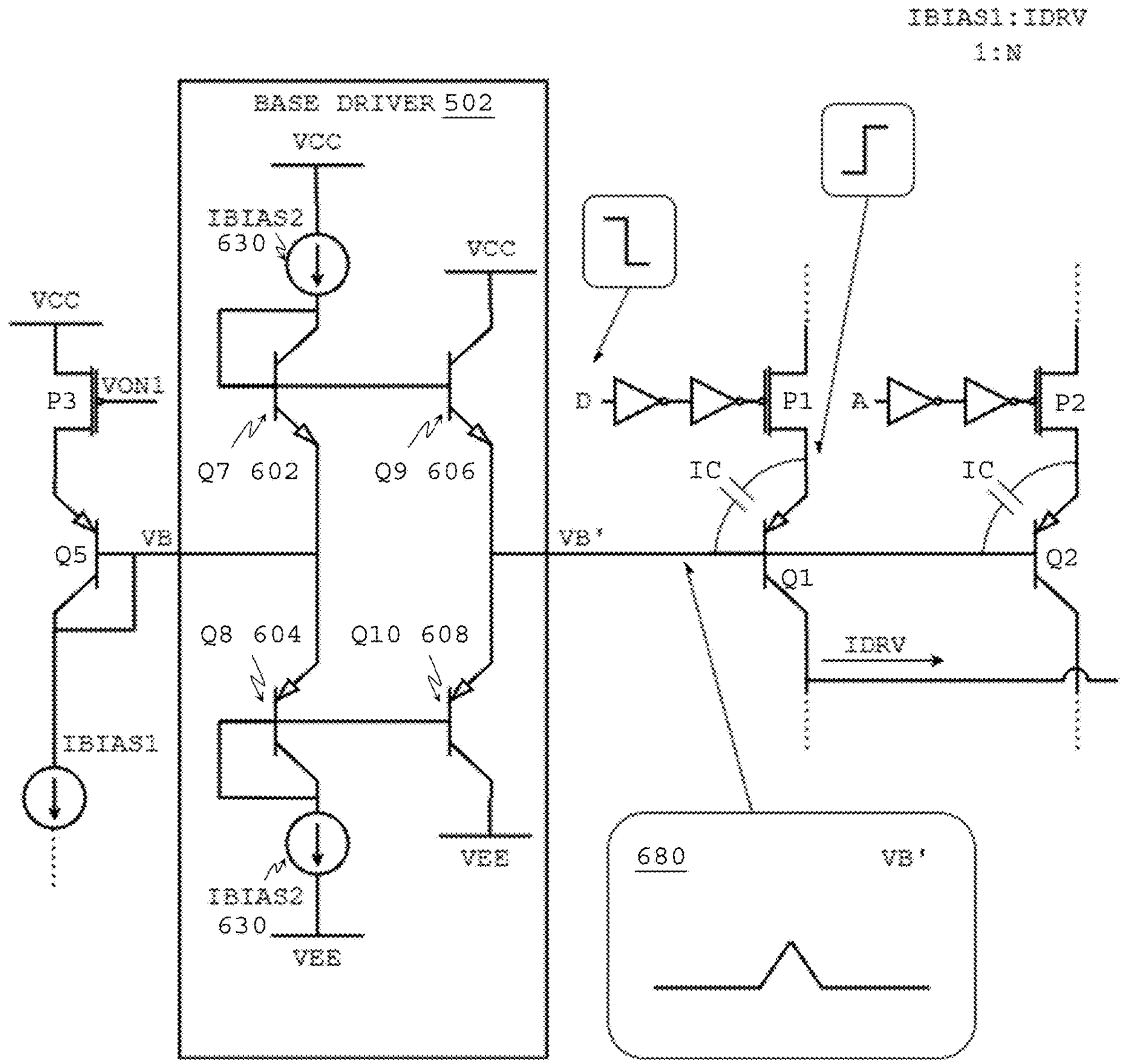
FIG. 6 illustrates an implementation of a base driver, according to some embodiments of the disclosure.

FIG. 6 illustrates an implementation of base driver 502, according to some embodiments of the disclosure. For simplicity, the implementation of base driver 502 is shown. It is envisioned that a suitable implementation based on the implementation of base driver 502 can be used in base driver 504 of FIG. 5. For simplicity, the transistors are referenced using their unique labels.

Base driver 502 (which may be referred to as a base driver circuit, a base voltage driver, or a base voltage driver circuit) may implement a push-pull driver as a voltage buffer. Base driver 502 may include two branches. A first branch may include a bias branch to receive a base voltage, such as VB. The first branch may implement a differential pair input structure. A second branch may include an output branch having an output to output a buffered base voltage, such as VB'. The second branch may implement a complementary push-pull output stage.

The first branch may include diode connected NPN Q7 602 and diode connected PNP Q8 604. NPN Q7 602 and PNP Q8 604 can establish the bias voltage (e.g., the voltage at the base terminals) for the transistors in the second branch. The base terminals of NPN Q7 602 and PNP Q8 604 are coupled to the base terminals of the corresponding transistors in the second branch. The emitter terminals of NPN Q7 602 and PNP Q8 604 are coupled together and form the input node of base driver 502 to receive the base voltage VB. Current sources 630 implementing a bias current (shown as IBIAS2) may flow through NPN Q7 602 and PNP Q8 604.

The second branch may include NPN Q9 606 and PNP Q10 608. NPN Q9 606 and PNP Q10 608 may be configured as emitter-followers (or common-collector mode), or where their emitter terminals are coupled together. The emitter terminals of NPN Q9 606 and PNP Q10 608 form the output node of base driver 502 to produce the buffered base voltage VB'. NPN Q9 606 and PNP Q10 608 can be configured in a complementary configuration. The base terminals of NPN Q9 606 and PNP Q10 608 are driven by a base voltage set by the diode connected transistors in the first branch. PNP Q10 608 can source current. PNP Q10 608 can supply a current from the emitter terminal and out of the collector terminal. NPN Q9 606 can sink current. NPN Q9 606 can provide a path for current to flow from the collector terminal to the emitter terminal. The second branch may include a push-pull branch having NPN Q9 606 and PNP Q10 608 whose emitter terminals are coupled together. The emitter terminals of NPN Q9 606 and PNP Q10 608 form the output of base driver 502.

If VB increases, NPN Q9 606 may conduct more, and PNP Q10 608 may conduct less. If VB decreases, NPN Q9 606 may conduct less, and PNP Q10 608 may conduct more. When NPN Q9 606 is conducting, the current may flow into the collector terminal from VCC and out of the emitter terminal to the output node and push current from VCC to the output node. When PNP Q10 608 is conducting, the current may flow into the emitter terminal and out of the collector terminal to VEE. In other words, PNP Q10 608 may pull current from the output node. The complementary action keeps the output node voltage VB' to be the same as VB.

In some implementations, base driver 502 may be implemented in an alternative configuration where a PNP transistor is connected to VCC and an NPN transistor is connected to VEE.

The push-pull mechanism implemented by the second branch effectively makes the output voltage match the input voltage. The mechanism buffers the input voltage to produce a buffered output voltage, where VB=VB'. Base driver 502 has high input impedance and low output impedance. Base driver 502 may have nearly unity voltage gain. During the preamplifier's operation, base driver 502 can sink or source significant or large AC current and have low output impedance when P1 and Q1 are switching (e.g., turning on), or when P2 and Q2 are switching (e.g., turning on). Base driver 502 can be passive. This creates an issue at the base terminal of Q1 when Q1 is switching, or at the base terminal of Q2 when Q2 is switching. In particular, the voltage at the base terminal of the PNP transistor (Q1 or Q2) can be temporarily pulled up or exhibit a hump. The same issue can occur with base driver 504, which is used to drive the base terminals of Q3 and Q4. The voltage at the base terminal of the NPN transistor can be temporarily pulled down or exhibit a dip. The magnitude of the hump/dip can depend on how strong base driver 502 is and how much current is being injected or taken out of the output node of base driver 502 during switching. The hump/dip compresses or decreases the base to emitter voltage (VBE) of the BJT that is in the process of turning on, which can slow down the turning on of the BJT dramatically and cause a slowdown of the rise time of the OSA overshoot current being produced by the BJT.

Suppose signal D has a falling edge. After passing through the buffer (two inverters), the gate terminal of P1 sees a falling edge as well and turns on P1. The gate terminal of P2 may be high and P2 is off. The signal at the drain terminal of P1 would rise as P1 turns on, appearing as a rising edge. Because there is an intrinsic capacitor (labeled IC) coupling the emitter terminal of Q1 (which is at the drain terminal of P1) to the base terminal of Q1 receiving VB' from the low-impedance output node of base driver 502, the rising edge signal at the drain terminal of P1 coupling through the intrinsic capacitor IC can cause current to be injected into the push-pull branch. The current being injected into the pushed pull branch would cause a hump in VB' at the base terminal of Q1, as illustrated by waveform 680.

Besides the hump/dip that would appear during switching of the output transistors in the H-bridge amplifier circuit, other issues can slow down the rise time of the output current. For example, transition frequency of BJTs, especially PNPs, can be limited. To realize a rise time of 50 ps, a 10-20 Gigahertz (GHz) transition frequency for a vertical PNP in a SiGe process is far from enough. The limited transition frequency can cause the output current to slow down when the current approaches a peak current, which extends the rise time.

While the description is focused on the base voltage VB' driving Q1 while signal D is switching P1 and Q1, a hump can appear with the base voltage VB' driving Q2 while signal A is switching P2 and Q2 of the H-bridge circuit. A dip can appear with the base voltage VA' driving Q3 while signal B is switching N1 and Q3 of the H-bridge circuit. A dip can appear with the base voltage VA' driving Q4 while signal C is switching N2 and Q4 of the H-bridge circuit.

Figure 7:
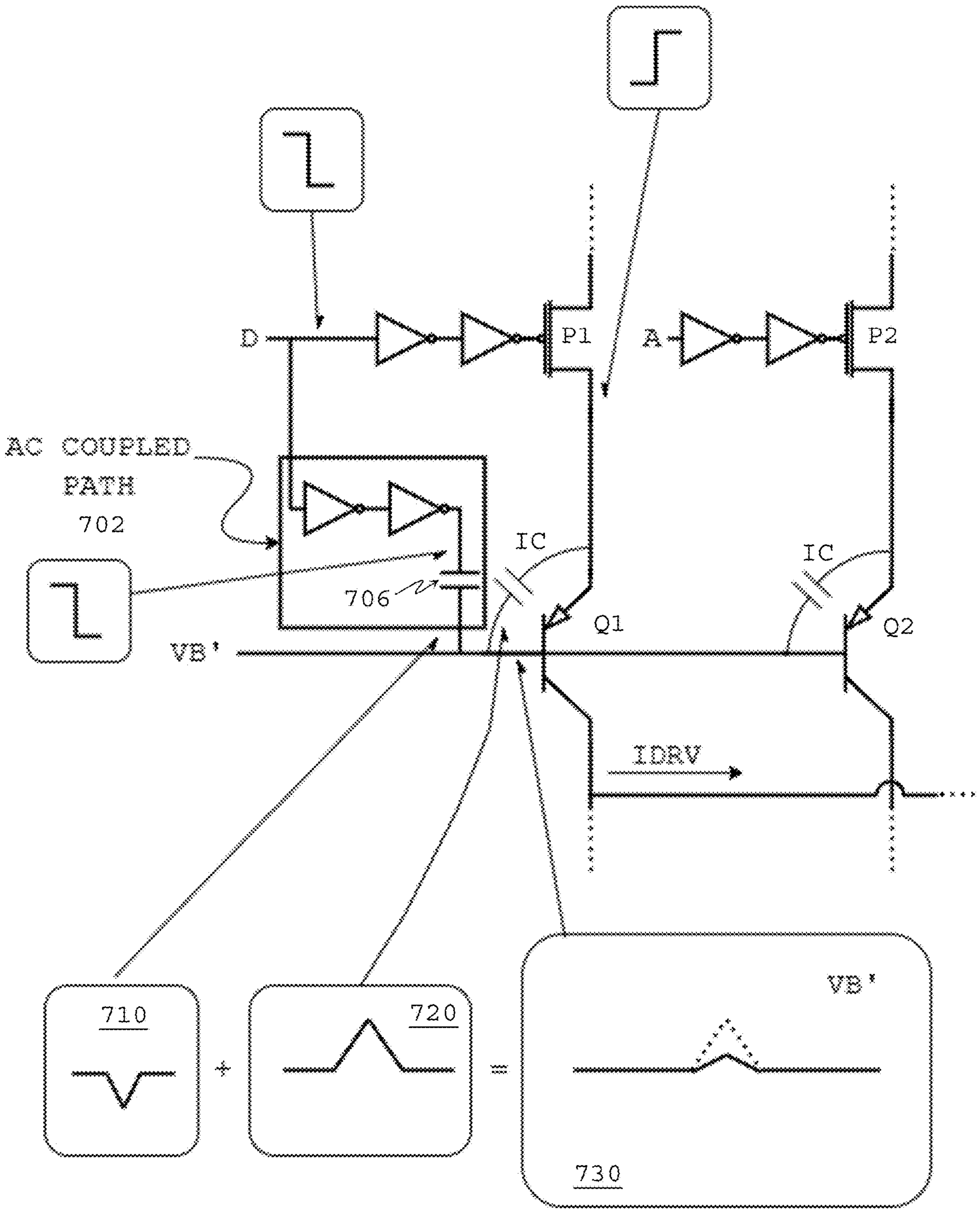
FIG. 7 illustrates an implementation of an alternating current (AC) coupled path, according to some embodiments of the disclosure.

FIG. 7 illustrates an implementation of AC coupled path 702, according to some embodiments of the disclosure. For simplicity, FIG. 7 illustrates AC coupled path 702 that is coupling signal D to the base terminal of Q1. It is envisioned that one or more AC coupled paths can be provided to AC couple another switching signal (A, B, or C) to the corresponding base terminal of a BJT in the H-bridge circuit.

To mitigate the hump illustrated in FIG. 6, AC coupled path 702 receives and couples the signal D to the base terminal of Q1. In particular, AC coupled path 702 includes a buffer (e.g., two inverters), and coupling capacitor 706. The buffer receives the signal D and the output of the buffer is coupled to the base terminal via coupling capacitor 706. The falling edge of signal D can go through the buffer and appear as a falling edge signal at the output of the buffer (e.g., the two inverters). The falling edge signal may couple through coupling capacitor 706 to the base terminal of Q1 and produce a dip as illustrated by waveform 710.

As discussed in FIG. 6, the falling edge in signal D through the buffer turning on P1 creates a rising edge signal at the drain terminal of P1. The rising edge signal coupling through the intrinsic capacitor IC to the base terminal of Q1 causes a hump as illustrated by waveform 720.

When the waveform 710 is added to waveform 720, the hump that is occurring during switching of P1 and Q1 is reduced or lowered, as illustrated by waveform 730. AC coupled path 702 can couple the voltage at the base terminal of Q1 down slightly to help reduce the hump resulting from the large current injected into the output node of base driver. While the AC coupled path 702 can mitigate the hump, the effect of AC coupled path 702 is limited because of the very low output impedance of the base driver. In some cases, a large capacitor and large inverter driver/buffer are implemented in AC coupled path 702, which can increase the power consumption of the amplifier.

Improving the Base Driver in a Preamplifier for a Writer

Figure 8:
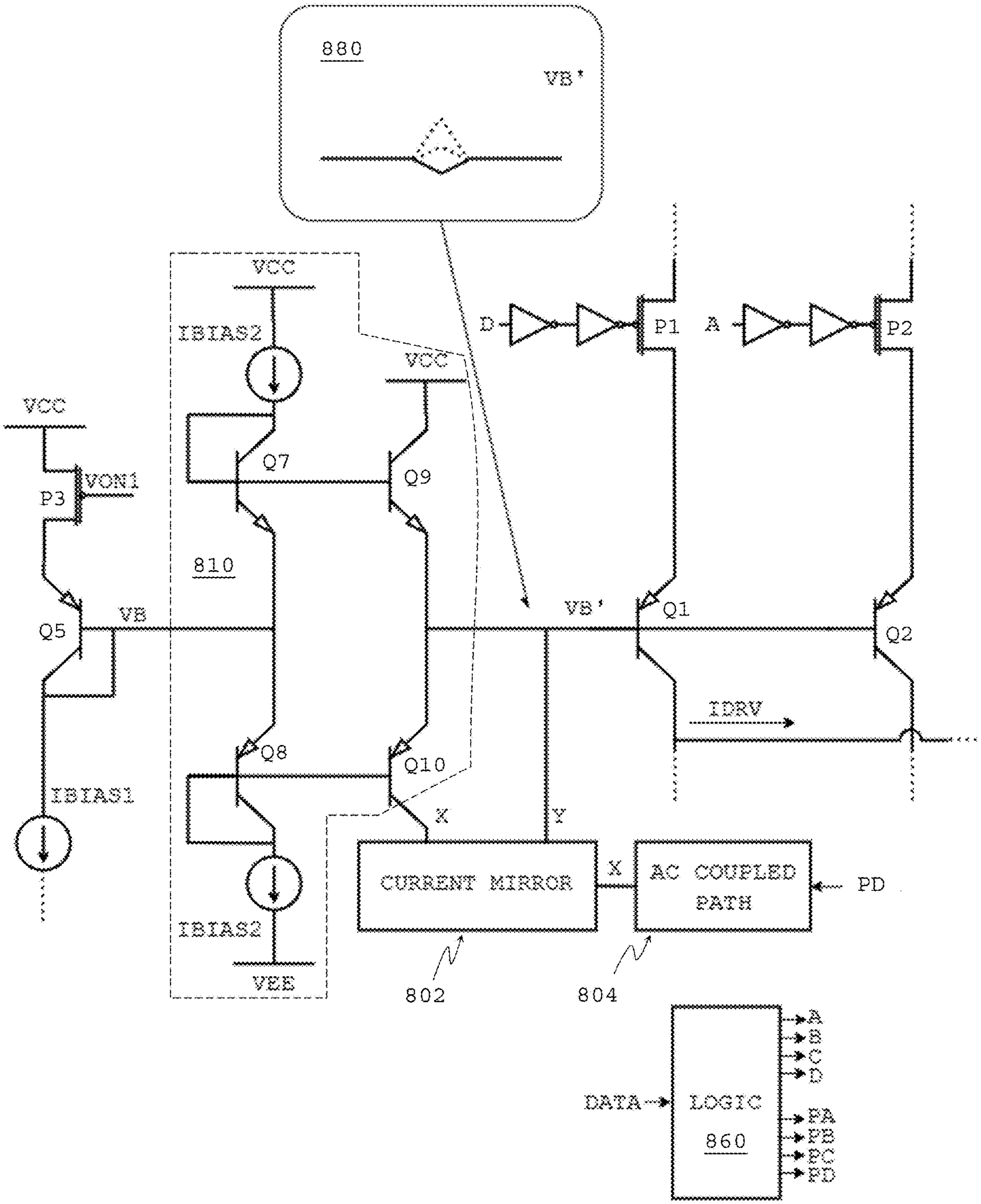
FIG. 8 illustrates an improved implementation of a base driver, according to some embodiments of the disclosure.

To address the limitations of AC coupled path 702, a different approach to addressing the hump/dip can be implemented. In particular, the AC coupled path is no longer directly coupled to the base terminal of Q1. FIG. 8 illustrates an improved implementation of a base driver, according to some embodiments of the disclosure. The base driver may include voltage buffer circuit 810, current mirror circuit 802, and AC coupled path 804 (referred to herein as AC coupled signal path). In some implementations, current mirror circuit 802 implements current mirroring. In some implementations, current mirror circuit 802 may implement current gain, current scaling, or current multiplication.

The preamplifier to produce an OSA overshoot current may include one or more improved base drivers as illustrated in FIG. 8, a bias circuit (e.g., bias circuit 330), and the H-bridge amplifier circuit as previously described in FIG. 3.

For simplicity, an implementation for addressing the hump appearing at the base terminal of Q1 when the signal D is switching on P1 and Q1 is depicted and described in detail. It is envisioned that described embodiments having current mirror circuit 802 and AC coupled path 804 can be implemented to address one or more of: the hump appearing at the base of Q2 when the signal A is switching on P2 and Q2, the dip appearing at the base of Q3 when the signal B is switching on N1 and Q3, and the dip appearing at the base of Q4 when the signal Cis switching on N2 and Q4.

The base driver may include logic 860 to generate switching signals A, B, C, and D based on data signal DATA. Logic 860 may generate boosting pulses PA, PB, PC, and PD based on data signal DATA, or based on switching signals A, B, C, and D respectively. Boosting pulses PA, PB, PC, and PD are short pulses that are based on and aligned with a transition edge appearing in respective switching signals A, B, C, and D that turns on the corresponding transistors in the H-bridge circuit. The pulse width of boosting pulses PA, PB, PC, and PD are significantly shorter or smaller than the pulses in switching signals A, B, C, and D. An exemplary boosting pulse is described in greater detail in FIG. 8. As illustrated previously in FIGS. 3-7, an output transistor of the H-bridge circuit, e.g., Q1, can turn on based on a switching signal, e.g., signal D, and output a current IDRV to a writer of a hard disk drive.

Node X is a node at the collector terminal of Q10. Current mirror circuit 802 may be coupled to node X. AC coupled path 804 may be coupled to node X. Node Y is the output node of voltage buffer circuit 810 having the buffered voltage VB' at the base terminal of Q1. Current mirror circuit 802 is coupled to node Y.

Voltage buffer circuit 810 may receive a voltage VB, and generate a buffered voltage, e.g., VB', to a base terminal of an output transistor, e.g., Q1. Voltage buffer circuit 810 may include a push-pull driver, as illustrated in FIG. 6 and discussed in FIG. 7.

The base driver may augment voltage buffer circuit 810 using current mirror circuit 802. Current mirror circuit 802 may be coupled to voltage buffer circuit 810, e.g., at node X. Current mirror circuit 802 may be coupled to AC coupled path 804, e.g., at node X.

AC coupled path 804 is driven by a signal, e.g., PD, which is dependent on and aligned with the switching signal D. AC coupled path 804 couples the signal PD to node X. Current mirror circuit 802 may conduct the signal from AC coupled path 804 to a base terminal of the output transistor, e.g., Q1. Current mirror circuit 802 may conduct the signal from AC coupled path 804 from node X to node Y to address the hump caused by the transition edge in switching signal D.

In some implementations, current mirror circuit 802 may be a current gain circuit or a current multiplier circuit to implement current scaling or generating a current that implements a certain gain ratio. In some implementations, the gain ratio is adjustable or tunable to control the scaling of the current being generated.

In some implementations, current mirror circuit 802 comprises a first branch coupled to voltage buffer circuit 810 and the AC coupled path 804, e.g., at node X. Current mirror circuit 802 comprises a second branch coupled to the base terminal of the output transistor Q1, e.g., at node Y. Exemplary circuit implementations of current mirror circuit 802 are described in greater detail in FIG. 9.

The base driver may include AC coupled path 804. AC coupled path 804 may receive a boosting pulse, e.g., boosting pulse PD, and output a signal based on the boosting pulse. The signal may be coupled to node X. In some implementations, AC coupled path 804 may include one or more inverters (e.g., an odd number of inverters) to receive the boosting pulse and a capacitor between an output of the one or more inverters and current mirror circuit 802. Exemplary circuit implementations of AC coupled path 804 are described in greater detail in FIG. 9.

Current mirror circuit 802 being coupled to node X and Y with AC coupled path 804 being coupled to node X can create a desirable effect to address the hump appearing at the base terminal of Q1 when the signal D is switching on P1 and Q1. In particular, current mirror circuit 802 and AC coupled path 804 can increase a base to emitter voltage of the output transistor, e.g., Q1, when the signal D is switching on P1 and Q1.

When signal D is switching on P1 and Q1, coupling of the boosting pulse PD via AC coupled path 804 can couple the base terminals of transistors in current mirror circuit 802 down briefly to cause a large current to be sunk from voltage buffer circuit 810, which in turn pulls the voltage of the base terminal of Q1 down to turn the hump into a dip, as illustrated in waveform 880. The temporary/transient dip when the signal D is switching on P1 and Q1 effectively increases the base to emitter voltage VBE of Q1 and causes Q1 to turn on faster and produce the output current faster. Increasing VBE of Q1 can create a boost current effect to the output node of the OSA current preamplifier, boosting the output current IDRV. As a result, the rise time of the current waveform driving the writer of the HDD is dramatically reduced and improved. Because of the larger impedance of current mirror circuit 802, the coupling strength at the base terminal of Q1 to reverse the hump and turn the hump into a dip can be realized in the preamplifier illustrated in FIG. 8. In some implementations, the coupling strength can be tunable, adjustable, or optimized by changing the gain ratio implemented in current mirror circuit 802.

Figure 9:
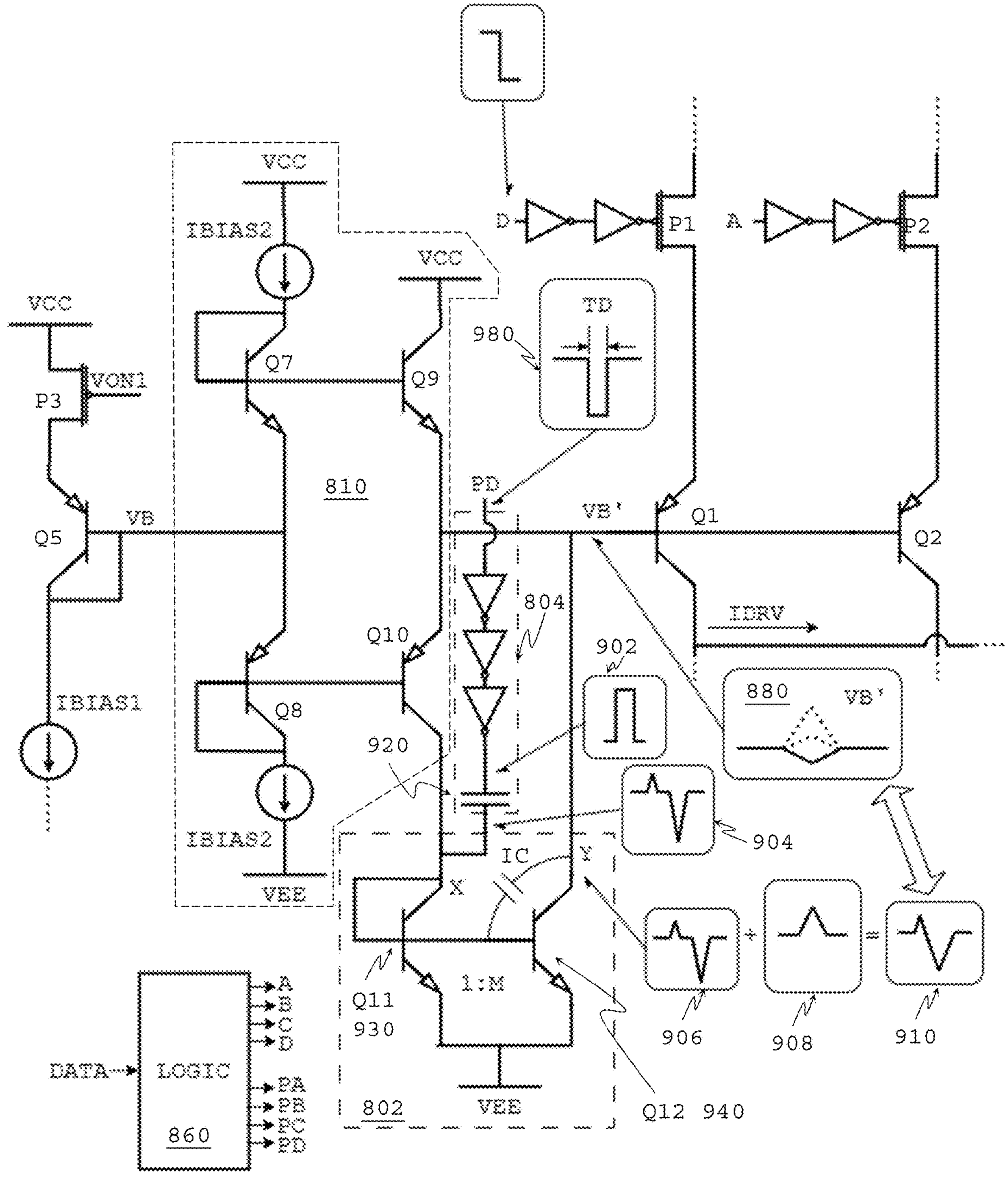
FIG. 9 illustrates an improved implementation of a base driver, according to some embodiments of the disclosure.

FIG. 9 illustrates an improved implementation of a base driver, according to some embodiments of the disclosure. The base driver may include voltage buffer circuit 810 as described in FIG. 8, current mirror circuit 802, and AC coupled path 804. The preamplifier to produce an OSA overshoot current may include the improved base driver as illustrated in FIG. 9, a bias circuit (e.g., bias circuit 330), and the H-bridge amplifier circuit as previously described in FIG. 3.

The improved base driver may include logic 860 to generate switching signals A, B, C, and D based on data signal DATA, such as a transition edge of data signal DATA. Logic 860 may generate boosting pulses PA, PB, PC, and PD based on data signal DATA (e.g., a transition edge of data signal DATA), or based on switching signals A, B, C, and D respectively.

In some implementations, logic 860 may output a pulse for AC coupled path 804, e.g., boosting pulse PD, based on a transition edge of a data signal, e.g., DATA. The waveform of boosting pulse PD is illustrated as waveform 980, which includes a falling edge and a rising edge, separated by a pulse duration of TD. The pulse duration TD may be between 160-260 ps.

In some implementations, logic 860 may output a switching pulse, e.g., signal D, based on the transition edge of the data signal. The switching pulse D and the boosting pulse PD are temporally aligned and calibrated to ensure that (1) the hump caused by the falling edge of pulse D, and (2) the pulling down of the base terminal of Q1 caused by the short pulse PD through AC coupled path 804 and current mirror circuit 802, are aligned sufficiently to effectively turn the hump into a dip.

As illustrated previously in FIGS. 3-8, the H-bridge amplifier circuit of the preamplifier includes a transistor Q1 having a base terminal and an output terminal (e.g., the collector terminal of Q1) to generate an output current IDRV, such as the OSA overshoot current. The output terminal can be coupled to a writer of an HDD, e.g., via a transmission line. Transistor Q1 can be a SiGe BJT, e.g., PNP or NPN. The H-bridge amplifier circuit further includes a transistor P1 having a gate terminal to receive the switching pulse, e.g., D, and a drain terminal coupled to an emitter terminal of transistor Q1. The transistor Q1 can be a MOSFET, e.g., PMOS or NMOS.

The improved base driver can include an output that is coupled to the base terminal of Q1, e.g., node Y having the buffered voltage VB' at the base terminal of Q1. The improved base driver is responsible for generating the base voltage to drive the base terminal of Q1. The improved base driver can include voltage buffer circuit 810 coupled to the output of the base driver, which is also coupled to the base terminal of Q1.

Voltage buffer circuit 810 may include a bias branch to receive a voltage, and an output branch to output a buffered voltage at the output of voltage buffer circuit 810. Voltage buffer circuit 810 may include a push-pull branch having transistor Q9 and a transistor Q10 whose emitter terminals are coupled together. The emitter terminals together form the output of voltage buffer circuit 810. The emitter terminals are coupled to the output of the base driver. Node X is a node of voltage buffer circuit 810, which is a node at a collector terminal of Q10.

The improved base driver includes current mirror circuit 802 having a first branch coupled to a node of voltage buffer circuit 810, e.g., node X at the collector terminal of Q10, and a second branch coupled to the base terminal of Q1, e.g., node Y at the output of the voltage buffer circuit. The first branch and one or more second branches can form current mirror circuit 802.

The first branch of current mirror circuit 802 may include diode connected NPN Q11 930. The collector terminal and base terminal of NPN Q11 930 are coupled to node X. The second branch of current mirror circuit 802 may include NPN Q12 940. The collector terminal of NPN Q12 940 is coupled to node Y, which is at the base terminal of Q1. The base terminals of diode connected NPN Q11 930 and NPN Q12 940 are coupled together.

The first branch and the second branch of current mirror circuit 802 (e.g., diode connected NPN Q11 930 and NPN Q12 940) are scaled according to a ratio of 1:M. M can be 1, 2, 4, 6, 8, etc. In one implementation, the ratio is 1:4.

The improved base driver includes AC coupled path 804 coupled to the node of voltage buffer circuit 810, e.g., node X at the collector terminal of Q10. AC coupled path 804 can include one or more inverters to receive the pulse, e.g., boosting pulse PD. AC coupled path 804 may include coupling capacitor 920 between an output of the one or more inverters and the node X. In some cases, the one or more inverters include an odd number of inverters to invert the pulse, e.g., boosting pulse PD.

Suppose signal D has a falling edge. The falling edge in signal D, which is a transition edge that switches P1 and Q1 on, as discussed in FIGS. 6-7, would cause a hump in VB' at the base terminal of Q1, which is shown as waveform 908. The boosting pulse PD, a short negative pulse, can go through the one or more inverters of AC coupled path 804 and becomes a short positive pulse, which is illustrated as waveform 902. Through coupling capacitor 920, the short positive pulse turns into a small hump and a large dip at node X, which is illustrated as waveform 904. The waveform 904 is generated by the rising edge and the falling edge of the short positive pulse coupling through coupling capacitor 920, when the pulse width of the short positive pulse is sufficiently short. The magnitude of the large dip is significantly greater than the magnitude of the small hump.

The signal illustrated by waveform 904 is conducted through the collector terminal and base terminal of diode connected transistor NPN Q11 930 to the base terminal of NPN Q12 940 through current mirror circuit 802. The signal is then coupled to the collector terminal of NPN Q12 940 via the intrinsic capacitor (labeled IC) from the base terminal of NPN Q12 940 to node Y, which is the collector terminal of NPN Q12 940. The signal appearing at the collector terminal of NPN Q12 940 (or node Y), illustrated as waveform 906, is substantially identical as the signal illustrated as waveform 904.

The signal at node X, as illustrated by waveform 904 can couple the base terminals of diode connected transistor NPN Q11 930 and NPN Q12 940 in current mirror circuit 802 down temporarily (when signal D has a falling edge). The signal waveform 906 would also appear at node Y through intrinsic capacitance IC across the base terminal and the collector terminal of NPN Q12 940, and can couple node Y down temporarily. Current mirror circuit 802 can sink a large current from voltage buffer circuit 810. When the resistance of diode connected transistor NPN Q11 930 is small, (only) high frequency signals from the short pulse of waveform 980 pass through AC coupled path 804 having coupling capacitor 920, which results in or forms the waveform 904. The current being sunk by NPN Q12 940 can be a multiple of the current through diode connected transistor NPN Q11 930, depending on the scaling ratio, e.g., 1:M. Sinking current at node Y pulls the base voltage VB' down temporarily countering the hump in the waveform 908 and turns the hump into a dip, as illustrated in waveform 910. When the waveform 906 (which has a small hump and a large dip because of the narrow pulse width TD of waveform 980) and waveform 908 (having a hump) are combined, the result is small hump and a large dip, as illustrated as waveform 910, which achieves the effect of waveform 880.

Adding current mirror circuit 802 to voltage buffer circuit 810 at node X and to node Y in the base driver can offer a larger impedance at node Y to address the hump, effectively making the base driver more robust against the current being injected via the intrinsic capacitance of Q1. In addition, the coupling effect of current mirror circuit 802 at node Y can counter the hump by turning the hump into a dip, which advantageously increases or enlarges VBE to make Q1 turn on faster to produce a current IDRV with a faster rise time.

Figure 10:
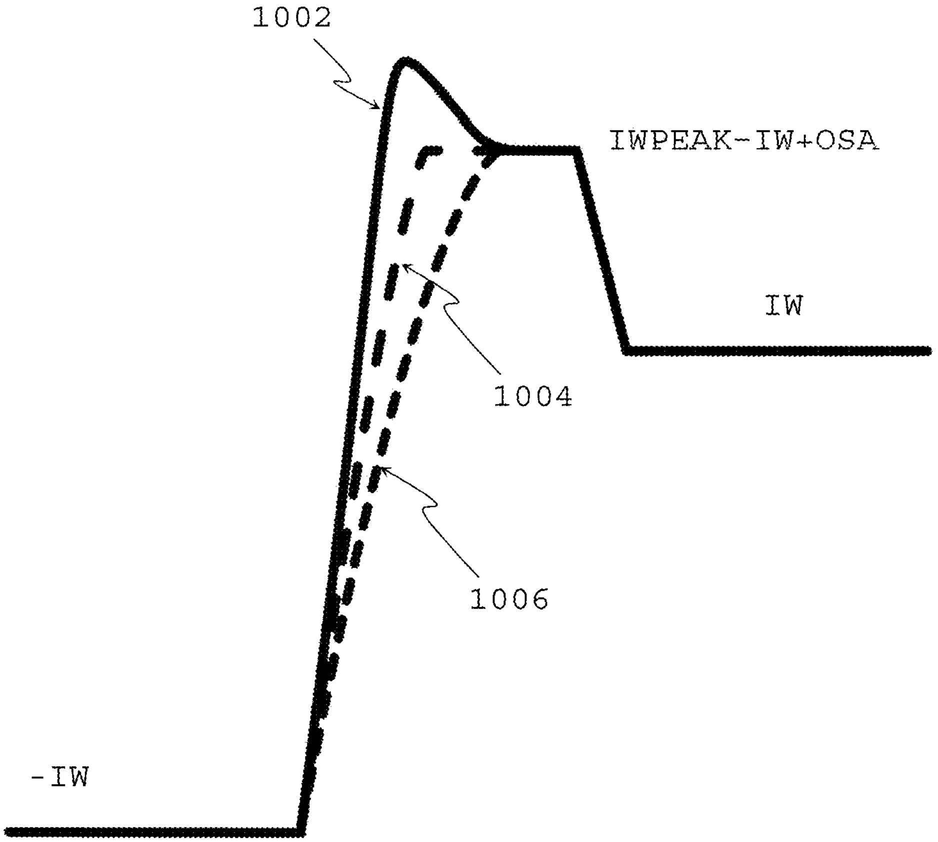
FIG. 10 contrasts rise time for different current waveforms for a writer, according to some embodiments of the disclosure.

FIG. 10 contrasts rise times for different current waveforms for a writer, according to some embodiments of the disclosure. Waveforms 1004, 1006, and 1002 represent current waveforms produced by different circuit implementations generating IWPEAK=IW+OSA. Waveforms 1004, 1006, and 1002 individually implements a preamplifier to produce a current IW, and a further preamplifier to produce an OSA overshoot current. Circuit implementation resulting in waveform 1006 does not utilize any AC coupled techniques to produce the OSA overshoot current, as seen in FIG. 6. Circuit implementation resulting in waveform 1004 utilizes an AC coupled technique to produce the OSA overshoot current, as seen in FIG. 7. By using the improved base driver as illustrated in FIGS. 8-9 in the preamplifier for generating the OSA overshoot current, the current waveform 1002 can be achieved. The rise time of the current waveform 1002 is significantly reduced and improved than other current waveforms (shown as dotted lined waveforms 1004 and 1006) when producing the same IWPEAK=IW+OSA.

Adjusting the coupling strength of the current mirror circuit and the AC coupled signal path to the base terminal of the output transistor (e.g., by adjusting the current mirror scaling ratio) can achieve a controlled peak to counter potential limitations of the bandwidth of the transmission line in suspension in an HDD system. The improved base driver reduces rise time, consumes less power and offers the feature of controlled, tunable peaking.

Exemplary Methods for Producing a Drive Current with Fast Rise Time

Figure 11:
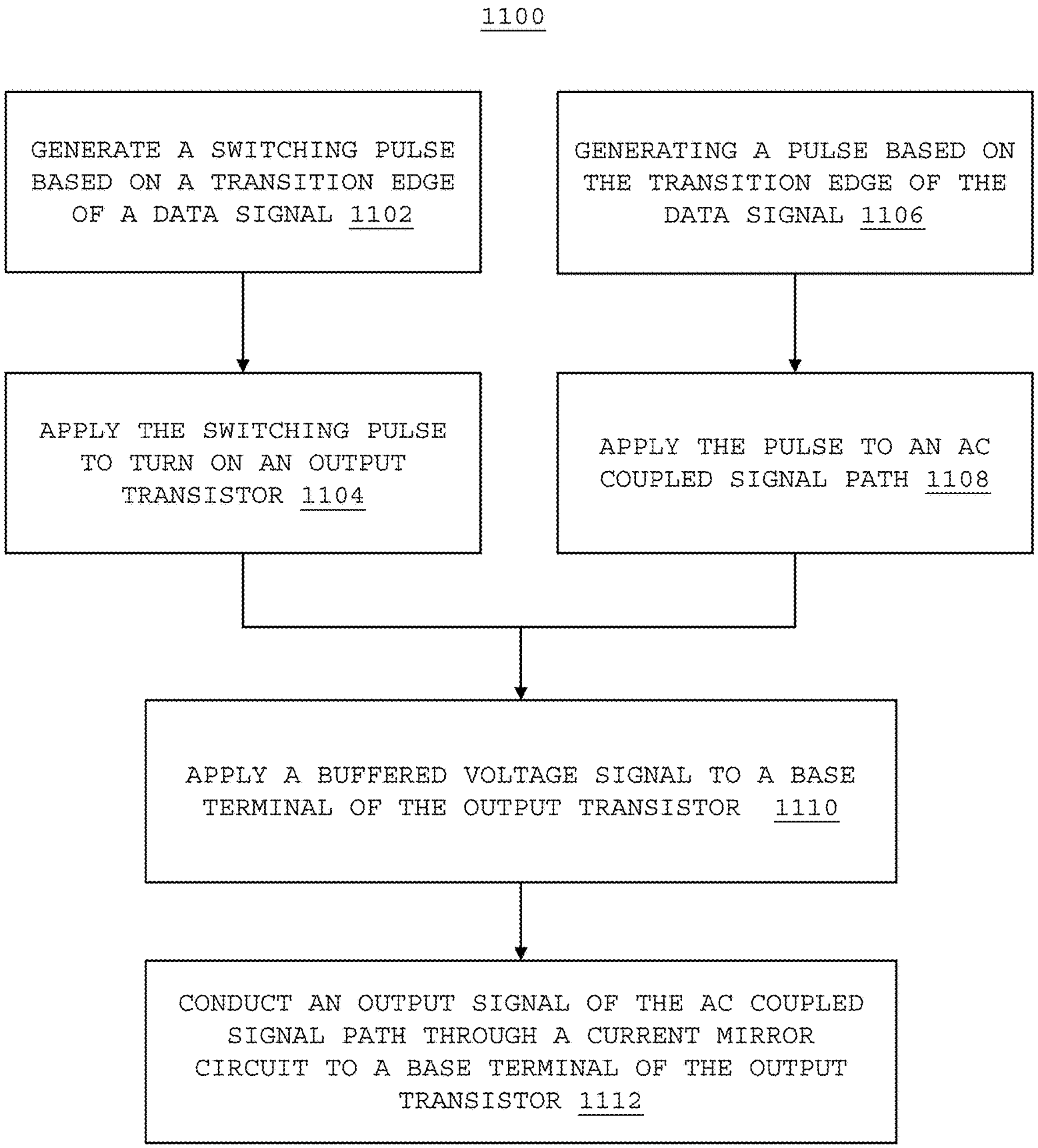
FIG. 11 depicts a flow chart illustrating a method to produce a drive current with fast rise time to drive a writer of a HDD, according to some embodiments of the disclosure.

FIG. 11 depicts a flow chart illustrating a method to produce a drive current with fast rise time to drive a writer of a HDD, according to some embodiments of the disclosure. Method 1100 may be performed by components illustrated in FIG. 8-9.

In 1102, logic may generate a switching signal based on a transition edge of a data signal.

In 1104, the switching signal may be applied to turn on an output transistor.

In 1106, logic may generate a boosting pulse based on the transition edge of the data signal.

In 1108, the boosting pulse may be applied to an AC coupled signal path.

In 1110, a buffered voltage signal may be applied to a base terminal of the output transistor.

In 1112, an output signal of the AC coupled signal path can be coupled through a current mirror circuit to the base terminal of the output transistor.

In some implementations, the boosting pulse has a pulse width of 160-260 picoseconds.

In some implementations, method 1100 may further include increasing a base to emitter voltage of the output transistor when the output transistor is turning on.

In some implementations, method 1100 may further include outputting, by the output transistor, a current to a writer of a hard disk drive.

SELECT EXAMPLES

Example 1 provides a circuit for generating a current waveform with fast rise time, including a first transistor having a base terminal, and an output terminal coupled to a writer of a hard disk drive; a base driver having: an output coupled to the base terminal of the first transistor, a voltage buffer circuit coupled to the output, a current mirror circuit having a first branch coupled to a node of the voltage buffer circuit and a second branch coupled to the base terminal of the first transistor, and a signal path coupled to the node; and logic to output a pulse for the signal path based on a transition edge of a data signal.

Example 2 provides the circuit of example 1, where the first transistor is a silicon-germanium bipolar junction transistor.

Example 3 provides the circuit of example 1 or 2, further including further logic to output a switching pulse based on the transition edge of the data signal; and a second transistor having a gate terminal to receive the switching pulse and a terminal coupled to a further terminal of the first transistor.

Example 4 provides the circuit of example 3, where the second transistor is a metal-oxide-semiconductor field-effect transistor.

Example 5 provides the circuit of any one of examples 1-4, where the voltage buffer circuit includes a bias branch to receive a voltage; and an output branch to output a buffered voltage.

Example 6 provides the circuit of any one of examples 1-5, where: the voltage buffer circuit includes a push-pull branch having a third transistor and a fourth transistor; an emitter terminal of the third transistor is coupled to an emitter terminal of the fourth transistor; the emitter terminals of the third transistor and the fourth transistor are coupled to the output of the base driver; and the node of the voltage buffer circuit is a collector terminal of the fourth transistor.

Example 7 provides the circuit of any one of examples 1-6, where: the first branch of the current mirror circuit includes a diode connected transistor; the second branch of the current mirror circuit includes a fifth transistor whose collector terminal is coupled to the base terminal of the first transistor; and base terminals of the diode connected transistor and the fifth transistor are coupled together.

Example 8 provides the circuit of any one of examples 1-7, where: the signal path includes one or more inverters to receive the pulse.

Example 9 provides the circuit of any one of examples 1-8, where: the signal path includes a capacitor between an output of one or more inverters and the node.

Example 10 provides the circuit of any one of examples 8 or 9, where: the one or more inverters include an odd number of inverters.

Example 11 provides the circuit of any one of examples 1-9, where the first branch and the second branch of the current mirror circuit are scaled according to a ratio of 1:4.

Example 12 provides a method for boosting a current waveform of a hard disk drive writer, including generating a switching signal based on a transition edge of a data signal; applying the switching signal to turn on an output transistor; generating a boosting pulse based on the transition edge of the data signal; applying the boosting pulse to an alternating current coupled signal path; applying a buffered voltage signal to a base terminal of the output transistor; and conducting an output signal of the alternating current coupled signal path through a current mirror circuit to the base terminal of the output transistor.

Example 13 provides the method of example 12, where the boosting pulse has a pulse width of 160-260 picoseconds.

Example 14 provides the method of example 12 or 13, further including increasing a base to emitter voltage of the output transistor when the output transistor is turning on.

Example 15 provides the method of any one of examples 12-14, further including outputting, by the output transistor, a current to a writer of a hard disk drive.

Example 16 provides a preamplifier for a writer of a hard disk drive with fast rise time, including logic to generate a switching signal based on a data signal and generate a boosting pulse based on the data signal; an output transistor of an H-bridge circuit, the output transistor to turn on based on the switching signal and output a current to the writer of the hard disk drive; a voltage buffer circuit having an output coupled to a base terminal of the output transistor; an alternating current coupled signal path to receive the boosting pulse and output a signal based on the boosting pulse; and a current mirror circuit coupled to the voltage buffer circuit and the alternating current coupled signal path, the current mirror circuit to conduct the signal to the base terminal of the output transistor.

Example 17 provides the preamplifier of example 16, where the current mirror circuit and the alternating current coupled signal path increase a base to emitter voltage of the output transistor.

Example 18 provides the preamplifier of example 16 or 17, where the alternating current coupled signal path includes one or more inverters to receive the boosting pulse and a capacitor between an output of the one or more inverters and the current mirror circuit.

Example 19 provides the preamplifier of any one of examples 16-18, where the current mirror circuit includes a first branch coupled to the voltage buffer circuit and the alternating current coupled signal path and a second branch coupled to the base terminal of the output transistor.

Example 20 provides the preamplifier of any one of examples 16-19, where the voltage buffer circuit includes a push-pull driver.

Example A provides an apparatus for performing any one of the methods of examples 12-15 or a method illustrated in FIG. 11.

Example B provides a circuit to produce an overshoot current for a writer with fast rise time as illustrated in FIG. 8.

Example C provides a circuit to produce an overshoot current for a writer with fast rise time as illustrated in FIG. 9.

VARIATIONS AND OTHER NOTES

The detailed description, such as the "Select examples" section, provide various examples of the embodiments disclosed herein.

As used herein, the term "coupled to" or "coupled with" refers to a relationship between electronic components or circuit elements wherein the components are in electronic communication with one another and capable of transmitting and/or receiving electrical signals between them. The term "coupled to" does not require a direct physical or electrical connection between the coupled components. Rather, "coupled to" can encompass arrangements where the components are connected through one or more intervening elements, components, circuits, or transmission paths. For example, a first component may be "coupled to" a second component through intermediate components such as resistors, capacitors, inductors, transistors, logic gates, buses, transformers, or other electronic components, or through intermediate transmission paths, while still maintaining the capability for electronic communication between the first and second components.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

For purposes of explanation, specific numbers, materials and configurations are set forth in order to provide a thorough understanding of the illustrative implementations. However, it will be apparent to one skilled in the art that the present disclosure may be practiced without the specific details and/or that the present disclosure may be practiced with only some of the described aspects. In other instances, well known features are omitted or simplified in order not to obscure the illustrative implementations.

Further, references are made to the accompanying drawings that form a part hereof, and in which are shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the disclosed subject matter. However, the order of description should not be construed as to imply that these operations are necessarily order dependent. In particular, these operations may not be performed in the order of presentation. Operations described may be performed in a different order from the described embodiment. Various additional operations may be performed or described operations may be omitted in additional embodiments.

For the purposes of the present disclosure, the phrase "A or B" or the phrase "A and/or B" means (A), (B), or (A and B). For the purposes of the present disclosure, the phrase "A, B, or C" or the phrase "A, B, and/or C" means (A), (B), (C), (A and B), (A and C), (B and C), or (A, B, and C). The term "between," when used with reference to measurement ranges, is inclusive of the ends of the measurement ranges.

The description uses the phrases "in an embodiment" or "in embodiments," which may each refer to one or more of the same or different embodiments. The terms "comprising," "including," "having," and the like, as used with respect to embodiments of the present disclosure, are synonymous. The disclosure may use perspective-based descriptions such as "above," "below," "top," "bottom," and "side" to explain various features of the drawings, but these terms are simply for ease of discussion, and do not imply a desired or required orientation. The accompanying drawings are not necessarily drawn to scale. Unless otherwise specified, the use of the ordinal adjectives "first," "second," and "third," etc., to describe a common object, merely indicates that different instances of like objects are being referred to and are not intended to imply that the objects so described must be in a given sequence, either temporally, spatially, in ranking or in any other manner.

In the following detailed description, various aspects of the illustrative implementations will be described using terms commonly employed by those skilled in the art to convey the substance of their work to others skilled in the art.

The terms "substantially," "close," "approximately," "near," and "about," generally refer to being within +/−20% of a target value as described herein or as known in the art. Similarly, terms indicating orientation of various elements, e.g., "coplanar," "perpendicular," "orthogonal," "parallel," or any other angle between the elements, generally refer to being within +/−5-20% of a target value as described herein or as known in the art.

In addition, the terms "comprise," "comprising," "include," "including," "have," "having" or any other variation thereof, are intended to cover a non-exclusive inclusion. For example, a method, process, or device, that comprises a list of elements is not necessarily limited to only those elements but may include other elements not expressly listed or inherent to such method, process, or device. Also, the term "or" refers to an inclusive "or" and not to an exclusive "or."

The systems, methods and devices of this disclosure each have several innovative aspects, no single one of which is solely responsible for all desirable attributes disclosed herein. Details of one or more implementations of the subject matter described in this specification are set forth in the description and the accompanying drawings.

The invention claimed is:

1. A circuit for generating a current waveform with fast rise time, comprising:
- a first transistor having a base terminal, and an output terminal coupled to a writer of a hard disk drive;
- a base driver having:
  - an output coupled to the base terminal of the first transistor,
  - a voltage buffer circuit coupled to the output,
  - a current mirror circuit having a first branch coupled to a node of the voltage buffer circuit and a second branch coupled to the base terminal of the first transistor, and
  - a signal path coupled to the node; and
- logic to output a pulse for the signal path based on a transition edge of a data signal.

2. The circuit of claim 1, wherein the first transistor is a silicon-germanium bipolar junction transistor.

3. The circuit of claim 1, further comprising:
- further logic to output a switching pulse based on the transition edge of the data signal; and a second transistor having a gate terminal to receive the switching pulse and a terminal coupled to a further terminal of the first transistor.

4. The circuit of claim 3, wherein the second transistor is a metal-oxide-semiconductor field-effect transistor.

5. The circuit of claim 1, wherein the voltage buffer circuit comprises:

a bias branch to receive a voltage; and an output branch to output a buffered voltage.

6. The circuit of claim 1, wherein:

the voltage buffer circuit comprises a push-pull branch having a third transistor and a fourth transistor;

an emitter terminal of the third transistor is coupled to an emitter terminal of the fourth transistor;

the emitter terminals of the third transistor and the fourth transistor are coupled to the output of the base driver; and the node of the voltage buffer circuit is a collector terminal of the fourth transistor.

7. The circuit of claim 1, wherein:

the first branch of the current mirror circuit comprises a diode connected transistor;

the second branch of the current mirror circuit comprises a fifth transistor whose collector terminal is coupled to the base terminal of the first transistor; and base terminals of the diode connected transistor and the fifth transistor are coupled together.

8. The circuit of claim 1, wherein:

the signal path comprises one or more inverters to receive the pulse.

9. The circuit of claim 8, wherein:

the one or more inverters comprise an odd number of inverters.

10. The circuit of claim 1, wherein:

the signal path comprises a capacitor between an output of one or more inverters and the node.

11. The circuit of claim 1, wherein the first branch and the second branch of the current mirror circuit are scaled according to a ratio of 1:4.

12. A method for boosting a current waveform of a hard disk drive writer, comprising:

generating a switching signal based on a transition edge of a data signal;

applying the switching signal to turn on an output transistor;

generating a boosting pulse based on the transition edge of the data signal;

applying the boosting pulse to an alternating current coupled signal path;

applying a buffered voltage signal to a base terminal of the output transistor; and conducting an output signal of the alternating current coupled signal path through a current mirror circuit to the base terminal of the output transistor.

13. The method of claim 12, wherein the boosting pulse has a pulse width of 160-260 picoseconds.

14. The method of claim 12, further comprising:

increasing a base to emitter voltage of the output transistor when the output transistor is turning on.

15. The method of claim 12, further comprising:

outputting, by the output transistor, a current to a writer of a hard disk drive.

16. A preamplifier for a writer of a hard disk drive with fast rise time, comprising:

logic to generate a switching signal based on a data signal and generate a boosting pulse based on the data signal;

an output transistor of an H-bridge circuit, the output transistor to turn on based on the switching signal and output a current to the writer of the hard disk drive;

a voltage buffer circuit having an output coupled to a base terminal of the output transistor;

an alternating current coupled signal path to receive the boosting pulse and output a signal based on the boosting pulse; and a current mirror circuit coupled to the voltage buffer circuit and the alternating current coupled signal path, the current mirror circuit to conduct the signal to the base terminal of the output transistor.

17. The preamplifier of claim 16, wherein the current mirror circuit and the alternating current coupled signal path increase a base to emitter voltage of the output transistor.

18. The preamplifier of claim 16, wherein the alternating current coupled signal path comprises one or more inverters to receive the boosting pulse and a capacitor between an output of the one or more inverters and the current mirror circuit.

19. The preamplifier of claim 16, wherein the current mirror circuit comprises a first branch coupled to the voltage buffer circuit and the alternating current coupled signal path and a second branch coupled to the base terminal of the output transistor.

20. The preamplifier of claim 16, wherein the voltage buffer circuit comprises a push-pull driver.

* * * * *